United States Patent
Sakakura et al.

(10) Patent No.: US 12,265,245 B2
(45) Date of Patent: Apr. 1, 2025

(54) METHOD OF FORMING BIREFRINGENT STRUCTURES IN AN OPTICAL ELEMENT

(71) Applicant: University of Southampton, Southampton (GB)

(72) Inventors: Masaaki Sakakura, Southampton (GB); Lei Wang, Southampton (GB); Peter Kazansky, Southampton (GB); Yanhao Yu, Southampton (GB); Yuhao Lei, Southampton (GB)

(73) Assignee: University of Southampton, Southampton (GB)

( * ) Notice: Subject to any disclaimer, the term of this patent is extended or adjusted under 35 U.S.C. 154(b) by 603 days.

(21) Appl. No.: 17/628,998

(22) PCT Filed: Aug. 27, 2020

(86) PCT No.: PCT/GB2020/052050
§ 371 (c)(1),
(2) Date: Jan. 21, 2022

(87) PCT Pub. No.: WO2021/038225
PCT Pub. Date: Mar. 4, 2021

(65) Prior Publication Data
US 2022/0268983 A1  Aug. 25, 2022

(30) Foreign Application Priority Data
Aug. 28, 2019 (GB) ........................ 1912337

(51) Int. Cl.
*G11B 7/09* (2006.01)
*C03C 23/00* (2006.01)
(Continued)

(52) U.S. Cl.
CPC ........ *G02B 5/3083* (2013.01); *C03C 23/0025* (2013.01); *G11B 7/0045* (2013.01);
(Continued)

(58) Field of Classification Search
CPC ........................................ G11B 7/09
See application file for complete search history.

(56) References Cited

U.S. PATENT DOCUMENTS 10,236,027 B1  3/2019 Georgiou et al.
2017/0351156 A1  12/2017 Imai et al.

FOREIGN PATENT DOCUMENTS

CN  103137146 A  * 6/2013  ........... G11B 7/0065
CN  108213718 A  * 6/2018  ........... B23K 26/046
(Continued)

OTHER PUBLICATIONS

Tan et al., Direct grating writing using femtosecond laser interference fringes formed at the focal point, J. Opt. A: Pure Appl. Opt. 7 169-174 (Year: 2005).*
CN 103137146 A English translation (Year: 2012).*
CN-108213718-A English translation (Year: 2018).*
International Search Report and Written Opinion of the International Searching Authority for corresponding International Patent Application No. PCT/GB2020/052050, mailed Nov. 11, 2020.
(Continued)

*Primary Examiner* — Charlie Y Peng
(74) *Attorney, Agent, or Firm* — Renner, Otto, Boisselle, & Sklar, LLP.

(57) ABSTRACT

A method of fabricating an optical element includes providing a substrate of a transparent material in which is to be formed a plurality of birefringent nanostructures spaced apart; generating from the output of a source of femtosecond laser pulses a laser beam group comprising a plurality of focused seeding beams having a circular polarisation; directing the laser beam group onto the surface of the substrate at a first position and applying one or more femtosecond laser pulses from each beam to corresponding volumes in the substrate; repeatedly translating the laser beam group relative to the substrate parallel to the line of seeding beams; translating the laser beam group relative to the substrate and repeating the repeated translation and application of the femtosecond laser pulses; wherein the relative translation of
(Continued)

the laser beam group and the substrate aligns the writing beam with successive corresponding volumes.

22 Claims, 9 Drawing Sheets

(51) Int. Cl.
    *G02B 5/30* (2006.01)
    *G11B 7/0045* (2006.01)
    *G02B 5/32* (2006.01)

(52) U.S. Cl.
    CPC .................. *G11B 7/09* (2013.01); *G02B 5/32* (2013.01); *G02B 2207/101* (2013.01)

(56) References Cited

FOREIGN PATENT DOCUMENTS

| EP | 1814112 A1 | 8/2007 |
|---|---|---|
| EP | 2965852 A1 | 1/2016 |
| WO | 2019/156740 | 8/2019 |
| WO | 2019/158910 | 8/2019 |
| WO | 2019/221898 | 11/2019 |
| WO | 2020/109767 | 6/2020 |
| WO | 2020/109768 | 6/2020 |

OTHER PUBLICATIONS

Search Report under Section 17 issued for corresponding GB Application No. 1912337.1, mailed Feb. 21, 2020.

Atoosa Sadat Arabanian et al. "Birefringence profile adjustment by spatial overlap of nano gratings induced by ultra-short laser pulses inside fused silica," Applied Physics A Materials Science & Processing, vol. 124, Issue 2, Article No. 172, Jan. 24, 2018.

P. G. Kazansky, H. Inouye, T. Mitsuyu, K .Miura, J. Qiu, K. Hirao, and F. Starrost, Phys. Rev. Lett., vol. 82, 2199-2102, 1999.

J. Zhang, M. Gecevičius, M. Beresna, P.G. Kazansky, Phys. Rev. Lett., vol. 112(3), 33901, 2014.

E. Bricchi, B.G. Klappauf, P.G. Kazansky, Opt. Lett., vol. 29, 119-201, 2004.

S. S. Fedotov, A. G. Okhrimchuk, A. S. Lipatiev, A. A. Stepko, K. I. Piyanzina, G. Y. Shakhgildyan, M. Y. Presniakov, I. S. Glebov, S. V. Lotarev and V. N. Sigaev, Opt. Lett., vol. 43(4), 851, 2018.

C. Hnatovskya, R. S. Taylor, P. P. Rajeev, E. Simova, V. R. Bhardwaj, D. M. Rayner, and P. B. Corkum, Appl. Phys. Lett. vol. 87, 014104, 2005.

Y. Hayasaki, T. Sugimoto, A. Takita, and N. Nishida, Appl. Phys. Lett., vol. 87, 031101-1, 2005.

K. Sakuma, S. Hasegawa, H. Takahashi, M. Ota, and Y. Hayasaki, Appl. Phys. B, vol. 119, 533-538, 2015.

\* cited by examiner

METHOD OF FORMING BIREFRINGENT STRUCTURES IN AN OPTICAL ELEMENT

This application is a national phase of International Application No. PCT/GB2020/052050 filed Aug. 27, 2020, which claims priority to United Kingdom Application No. 1912337.1 filed Aug. 28, 2019, the entire disclosures of which are hereby incorporated by reference.

BACKGROUND OF THE INVENTION

The present invention relates to a method of forming birefringent structures in an optical element.

A class of optical materials comprises transparent substrates internally structured with anisotropic nanostructures that give birefringent properties to the material. Formation of such anisotropic sub-wavelength structures was first reported in 1999 [1]. The nanostructure is formed by irradiating the substrate material, such as silica glass, with ultrashort pulses of laser light. Nanostructuring allows materials to be used as elements for manipulating light via the geometric phase, but more recently, the materials have been proposed for data storage [2]. The nanostructure is made up of individual nanopores with an anisotropic shape, or assembled and aligned into a grating format. These features give the nanostructure an overall birefringence with an optical retardance value and a slow axis of birefringence. Both the retardance and the slow axis orientation can be controlled by setting polarisation properties of the laser pulses used to create the nanopores. Hence, by forming one or more nanostructures in a particular position using focused laser pulses, a data voxel with five degrees of freedom can be created: the three spatial dimensions corresponding to the voxel's position within the substrate, plus the retardance and slow axis values [3]. Data can be encoded by choosing values for these five properties, which offers a large data capacity, and the data accessibility is high because of the transparency of the substrate material. Significantly, data written in this way is expected to have an almost unlimited lifetime (estimated at longer than $10^{10}$ years at 426 K). Such so-called 5D optical data storage is therefore an attractive option for meeting the demands of modern data storage, which requires durability, high capacity, and ease of accessibility in order to accurately preserve extensive digital data far into the future.

In order for 5D data storage to become a widespread solution, the writing of the data should be via an efficient and accurate process. In particular, the speed of the data writing is of interest, and preferably should be as fast as possible while providing consistent quality. To achieve a high speed, the writing can be performed by directing the focused laser pulses to each required voxel position by scanning or translating the beam of laser pulses relative to the substrate. Initially proposed methods use a plurality of linearly or elliptically polarised pulses directed at the same position in the substrate to write each voxel by forming the required birefringence [4]. The speed of writing is limited by the time needed to deliver the multiple pulses plus the need for careful positioning of the beam relative to the substrate to ensure that all pulses are delivered to the same position. A more recent proposal uses a plurality of circularly polarised pulses to create a region of non-birefringent nanopores, which are then converted into a birefringent nanostructure by the subsequent delivery of just a single non-circularly polarised pulse [5]. Hence, the actual writing of data can be very fast, requiring just one pulse per voxel, but the initial treatment with multiple circularly polarised pulses can be time-consuming, with forty or more pulses being appropriate to enable reasonable birefringence.

Accordingly, techniques able to increase the speed of creating anisotropic, birefringent, nanopores in a substrate material are of interest.

SUMMARY OF THE INVENTION

Aspects and embodiments are set out in the appended claims.

According to a first aspect of certain embodiments described herein, there is provided a method of fabricating an optical element comprising: providing a substrate of a transparent material in which is to be formed a plurality of birefringent nanostructures spaced apart in plane substantially parallel to a surface of the substrate in a first direction by a distance X and in a second direction by a distance Y; generating from the output of a source of femtosecond laser pulses a laser beam group comprising a plurality of focused seeding beams having a circular polarisation and spaced apart along a line by the distance X and a focused writing beam having a non-circular polarisation and spaced apart from one of the seeding beams by the distance Y or the distance X; directing the laser beam group onto the surface of the substrate at a first position and applying one or more femtosecond laser pulses from each beam to corresponding volumes in the substrate; repeatedly translating the laser beam group relative to the substrate parallel to the line of seeding beams and along the first direction by the distance X to a next position and applying one or more femtosecond laser pulses from each beam, in order to deliver a plurality of femtosecond laser pulses from the seeding beams to each corresponding volume to create substantially optically isotropic nanostructures in the corresponding volumes; translating the laser beam group relative to the substrate along the second direction by the distance Y and repeating the repeated translation and application of the femtosecond laser pulses along the first direction; wherein the relative translation of the laser beam group and the substrate aligns the writing beam with successive corresponding volumes in which substantially optically isotropic nanostructures have been created, so that the one or more femtosecond laser pulses applied from the writing beam transform the optically isotropic nanostructure in each corresponding volume into an optically anisotropic nanostructure with optical birefringence.

According to a second aspect of certain embodiments described herein, there is provided an optical element fabricated according to the method of the first aspect.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, methods may be provided in accordance with approaches described herein which includes any one or more of the various features described below as appropriate.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
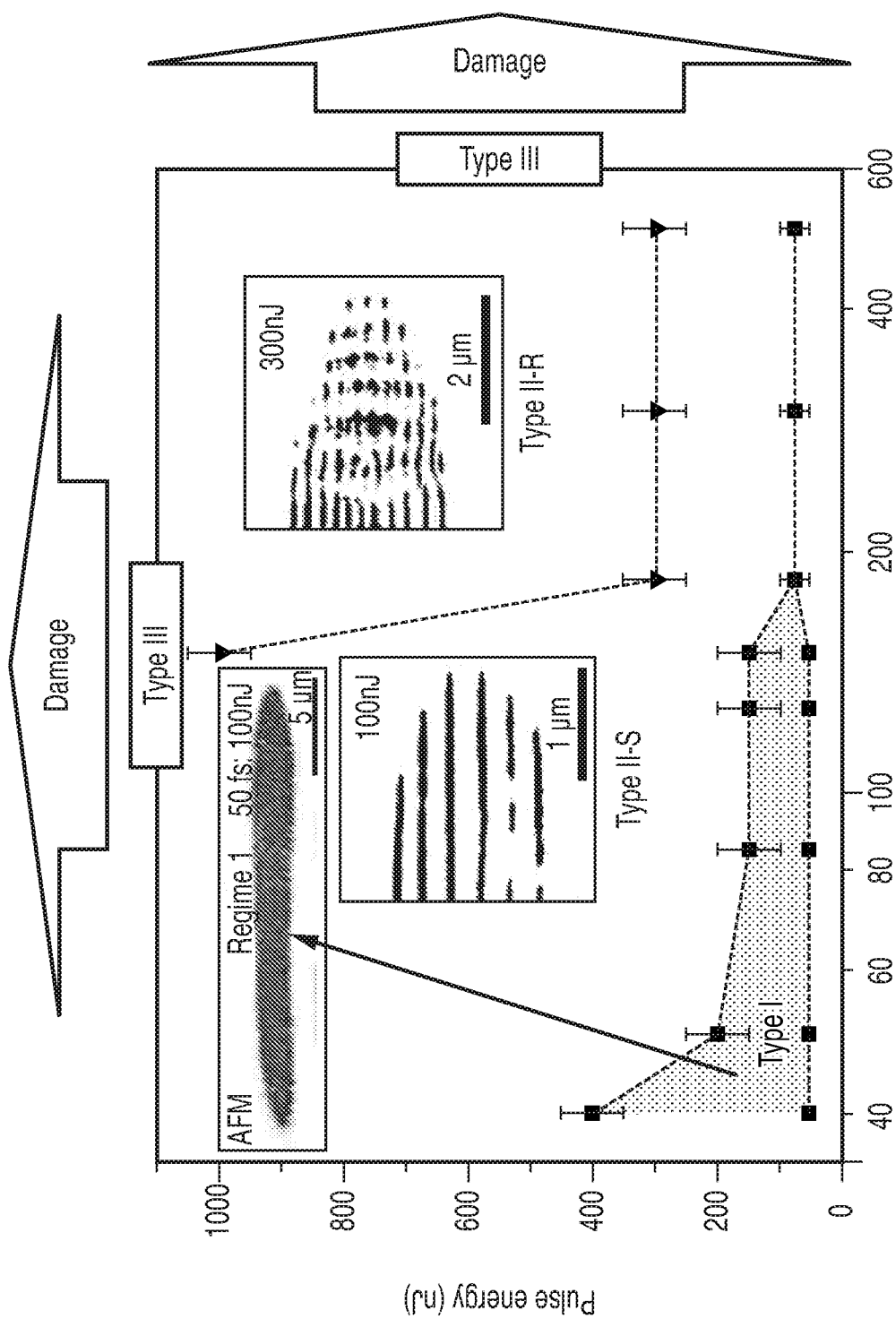
FIG. 1 shows a map of nanostructural modification type dependence on the energy and pulse duration of a writing light beam.

Aspects and features of certain examples and embodiments are discussed/described herein. Some aspects and features of certain examples and embodiments may be implemented conventionally and these are not discussed/described in detail in the interests of brevity. It will thus be appreciated that aspects and features of methods discussed herein which are not described in detail may be implemented in accordance with any conventional techniques for implementing such aspects and features.

Embodiments of the present disclosure relate to methods for fabricating nanostructured optical elements, in other words, forming birefringent nanostructures in optical elements, for example elements for optically storing data or elements that use the geometric phase effect to modify the polarisation and/or phase of light. In the present disclosure, the term "optical element" refers to a substrate of appropriate material patterned with a nanostructure as described for optical use, regardless of the nature of the intended application, use or purpose of the nanostructured material. Such applications may or may not relate to data storage or make use of the geometric phase.

Optical elements comprising one or more nanostructures induced in a suitable material such as glass using an incident ultrashort (ultrafast) pulsed laser beam have significant application as optical data storage elements. The nanostructure of the optical element comprises a collection of nanopores in a periodic or random distribution in an optically transparent material, such as silica glass. The nanopores are nanometre-scale structural modifications or changes in the bulk material. Although not yet well understood, the nanopores are likely to be voids created in the bulk material by the action of the incident laser pulses, and have a shape and orientation that depends on the optical properties of the laser pulses, and which confer the birefringent properties to the material.

Laser-induced writing processes for creating the nanostructures comprise scanning or writing an ultrashort pulsed focused laser beam over the material intended for the optical element, and are performed to deliver sufficient energy to create a nanostructure of a particular type, where various types are described in more detail below. Some nanostructures have the form of nanogratings, in which an amount of optical energy is delivered which causes the nanopores to become self-organised into a periodic distribution that acts as an optical grating, but the phenomenon is more general and includes other types of structural modification that can be induced by ultrafast laser irradiation of bulk optically transparent material, in particular silica glass. The type of structure is dependent in part on the parameters of the incident laser pulses. The structural modification is the presence of the nanopores, and is in effect a change in the material that alters its refractive index and provides a birefringence. Hence the optical properties of materials can be engineered by writing nanostructures into the material. If this is carried out in spaced-apart localised regions, the nanostructures can act as voxels to record data in the material.

FIG. 1 shows a plot of the relationship between laser pulse duration and pulse energy and the resulting structural change induced in a bulk transparent material, in this case fused silica. The pulsed laser beam is focused and directed at a location or moved or scanned along a path over the surface of a sample or blank of the material (a substrate) to induce the structural change in the volume of the material behind the area covered by the scan path, at a rate that can be referred to a writing speed or scan speed. For a given pulse repetition rate, the speed of the writing determines the number of pulses delivered to any part of the material, referred to as the pulse density, in units of number of pulses per distance of path length. The total amount of energy delivered to the material then depends on the energy per pulse. A faster writing speed gives a lower pulse density and lower total energy for a given pulse energy, and a slower writing speed gives a higher pulse density and higher total energy for a given pulse energy. The data in FIG. 1 is obtained for a constant writing speed that is considered to be a slow writing speed, delivering a pulse density of more than $10^6$ pulses per millimetre of path length (pulse/mm). The laser emits femtosecond pulses, that is, pulses of duration up to about 1000 fs. Hence the structural modification induced by the energy of the incident laser pulses can be termed "femtosecond laser damage modification" (FLDM).

The type of structural modification, and the threshold of laser beam energy required to produce it, depends on factors including the laser parameters (pulse duration, pulse energy, pulse repetition rate, and wavelength), the numerical aperture of a lens or other focusing arrangement used to focus the beam onto or into the material substrate, and the properties of the material itself (including band gap and thermal properties).

Three types of modification that have been defined are shown in FIG. 1: types I, II and III. In fused silica, the transition from type I to type II to type III is observed with an increase of pulse energy. Alternatively, type I may evolve into type II with an increased pulse duration or pulse density, if other parameters are constant. A type I modification is obtained from shorter pulses and lower pulse energies; this is an isotropic, or smooth, refractive index change or modification, lacking birefringence owing to the absence of anisotropy. This is shown in the inset picture in FIG. 1 corresponding to the type I area, achieved using pulse energies between 50 and 100 nJ. At higher pulse energies and longer pulses, a type II modification is obtained, which is a form birefringence associated with nanogratings formed of self-assembled nanopores and a negative refractive index change. Type II modifications can be divided into two sub-types. Within the type II regime, lower energies and shorter pulses produce a type II-S (smooth) modification comprising nanogratings embedded in a smooth index modification. The type II-S area in FIG. 1 includes an inset picture of such a structure produced from 100 nJ pulses. Higher pulse energies and longer pulses produce a type II-R (rough) modification comprising a complex morphology of disrupted regions, nanogratings and smooth modification. The type II-R area in FIG. 1 includes an inset picture of such a structure produced from 300 nJ pulses. Further increases in pulse energy and duration produce damage in the material; this is designated as a type III modification.

The formation of the various structural modification types is a competitive process, with a particular type dominating according to the processing conditions. Under certain processing conditions, type I can dominate over type II and III, or vice versa. Using short laser pulses, there is not enough energy deposited to the lattice of the bulk material to induce nanogratings or voids. Instead, random defects or nanostructures and local densification can be initiated which causes the positive index change. Alternatively, using extreme conditions such as high laser pulse repetition rates (typically in excess of 10 MHz), the laser pulses can provide sufficient accumulated heat and lattice thermalisation to induce permanent material modification. However, due to high fictive temperatures the structure has enough time to relax (erase) before the re-solidification takes place, resulting in densification and positive index change. Using low laser pulse repetition rates, longer laser pulses, high numerical aperture, or high pulse density, the threshold of energy from the laser pulses required for a type I modification overlaps with the energy threshold of type II or type III. In this case, the type II or III will dominate and the modification starts with the formation of nanogratings or damage, and the local temperature is low enough that the re-solidification takes place before the structure relaxes. Using very high energies, under any circumstances, the damage of type III is produced.

As noted above, the type I structure has no optical anisotropy, the type II structure consists of nanogratings providing an anisotropic refractive index pattern and hence birefringence, where there is a strong dependence of the anisotropy on the polarisation of the writing beam, and the type III structure comprises damage with no polarisation-dependent anisotropy. A type II modification or structure behaves as a uniaxial birefringent material with an optical axis (slow axis of the birefringence) which is parallel to the direction of polarisation of the writing laser beam.

Note that in the present disclosure, the term "nanostructure" may refer to individual structures (nanopores) within a nanograting (the nanograting is a collection of nanostructures or nanopores), or may refer to the overall structural modification making up a nanograting or other pattern of laser-induced structural modification (the nanograting is itself a nanostructure which is formed from nanopores). "Structure" and "nanostructure" may be used interchangeably, except if specifically indicated otherwise, or clear from the context. The term "nanostructure" indicates a structure with dimensions on the nanometre scale (i.e. 1000 nm or less, typically much less), which can also be considered as "sub-wavelength" structures in that the dimensions are smaller than the wavelength of light with which the optical element is fabricated and for which the optical element is designed. Each nanopore is an individual structural modification on the nanometre scale, in the form of a void in the bulk material that has a shape and orientation defined by the properties of the writing laser pulses.

A further type of structural modification can be designated as type X [7], which can have a reduced optical propagation loss compared to type II structures, while still providing birefringence. Typically, a high pulse density delivered at a slow writing speed is used to minimise loss in type II structures since this allows an improved quality of the self-assembled nanostructure. Type X structures can be written using a contrary approach of reduced pulse density, for example delivered by increasing the writing speed (and hence a reduction in the total energy delivered to the material), and can show a significantly reduced loss compared to type II nanogratings. A type X modification comprises randomly distributed individual nanopores or nanostructures, as would be expected in the absence of the high pulse density employed to form self-assembled regular type II structures. Note that in the present disclosure, the term "random" is used to describe that the nanostructures or nanopores in a type X modification are arranged without any discernible periodicity or pattern. The spacing between adjacent nanopores is random, and the individual nanopores are positioned at random in a layer within the thickness of the bulk material.

Periodicity of the nanostructures is not required to provide the desired birefringence, however, which instead depends on the orientation of the individual structures within the bulk material. Hence, the absence of self-assembly is not a barrier to the production of high quality optical elements. Also, the type X anisotropy is controlled by the polarisation of the laser writing beam. Each nanopore has an anisotropy defined by its shape, which is an oblate spheroid (ellipsoid) shape, or lenticular shape. As noted, the nanopores are randomly spaced apart within the substrate material, although lying generally within a layer at a constant depth behind the optical input surface of the optical element. More than one layer may be written depending on the intended use of the optical element; 5D data storage may use multiple layers, for example, each being a layer of voxels in a 3D array, and the nanopores within each layer being grouped into separate voxels. Each voxel comprises a plurality of nanopores which may have substantially the same or a similar size, shape and orientation, and the average orientation of the nanopores in a voxel is determined by the polarisation orientation of the writing pulses. These properties vary between voxels in order to encode data via differences in the retardance and the slow axis. The oblate spheroid shape of each nanopore is oriented with the plane of its circular cross section parallel to the optical propagation direction through the optical element and perpendicular to the input surface of the optical element (the surface scanned by the writing beam). The elliptical or oval cross-section which is parallel to the input surface can be oriented with its major axis at any angle, where the major axis is formed perpendicular to the polarisation of the writing light beam. The minor axis is parallel to the polarisation of the writing light beam. Since the overall shape is lenticular, the extent of the nanostructure in the optical propagation direction, namely the length along the direction through the thickness of the optical element from the input surface to the output surface, may be the same as or similar to the major axis. The overall shape of the nanostructure is determined by the intensity distribution of the laser pulses near the focal point. Type X can be thought of an intermediate type of structural modification, having a random distribution of nanostructures which nevertheless has a strong polarisation-dependent anisotropy.

Figure 2:
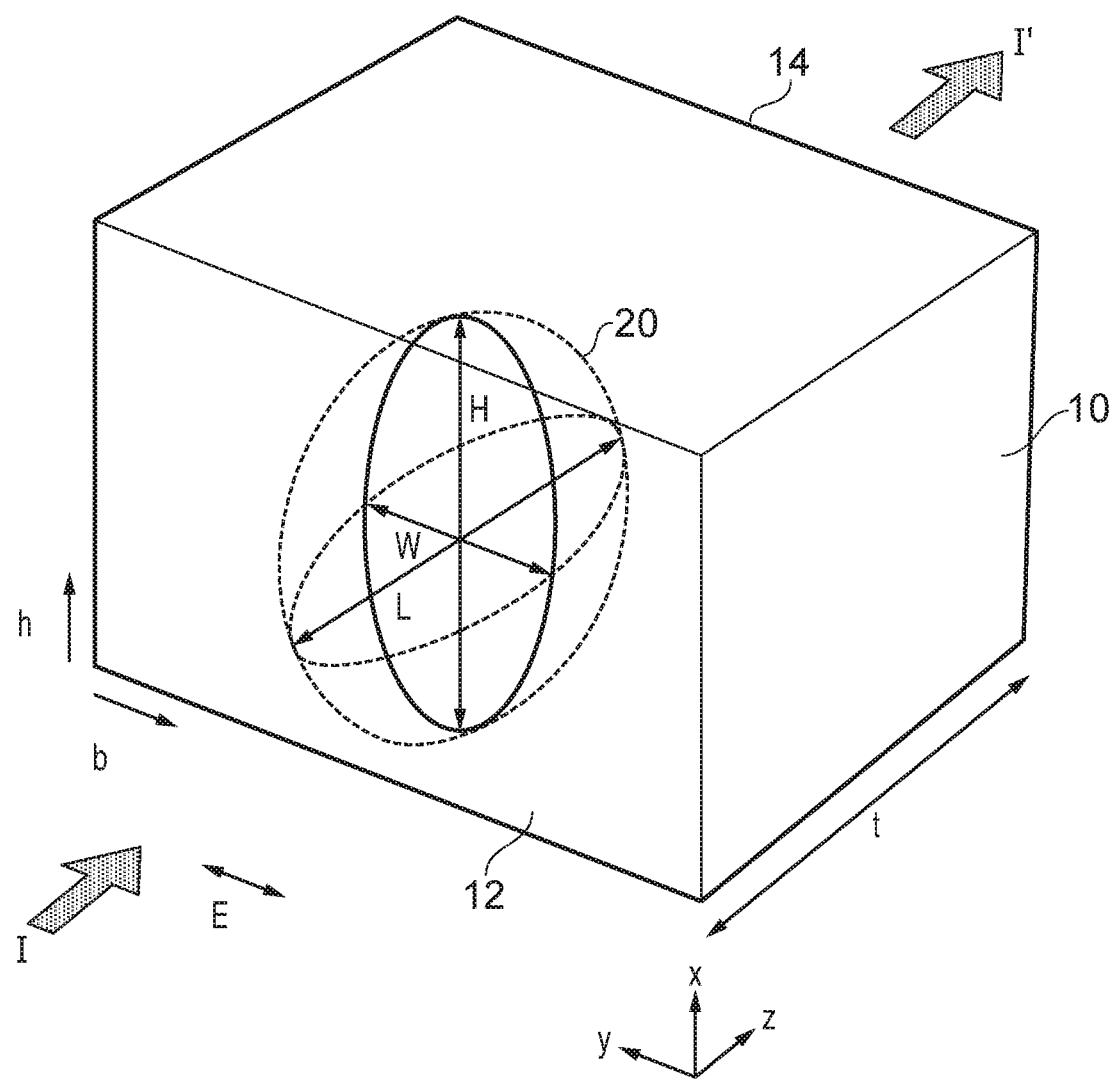
FIG. 2 shows a simplified schematic representation of an individual oblate anisotropic nanopore or nanostructure within a substrate.

FIG. 2 shows a highly schematic and not-to-scale representation of an individual nanopore 20 within an optical element 10. For clarity, just a single nanopore is shown, but as described above, in reality the nanostructural modification comprises many such nanopores randomly arranged within the material of the optical element. The optical element 10 has an input face 12 for receiving incident light, which propagates through the optical element along a propagation direction z which is parallel to the thickness t of the optical element and leaves through an output face 14 opposite to the input face 12. For the initial writing, the incident light beam I has a polarisation E which in this example is linear and aligned parallel to the y direction, or breadth of the sample forming the optical element 10. In use of the formed optical element, an incident or input light beam I is modified or transformed into output light beam I' by the birefringence of the optical element 10 created by the writing process, or used to read data encoded by the nanopores. The nanopore 20 has a length L substantially parallel to the thickness t of the optical element, which is typically not greater than 100 nm. The length L is perpendicular to the plane of the input face 12. The nanopore 20 has a cross-sectional shape in a plane parallel to the input face which has an oval, elliptical or oblate shape, with a major axis or height H and a smaller minor axis or width W orthogonal to the height. The major axis is larger than the minor axis. The width W has a size not larger than about 30 nm, typically. Owing to the oblate spheroidal shape of the nanopore 20, the length L and the height H may be substantially equal so that the cross-section of the nanopore 20 through the length L and height H is roughly circular. In some cases there may be some small or more significant difference between the length L and height H, since the growth of the nanopore during the writing process along these two dimensions may evolve differently. For example, the length L may become greater than the height H. Typically, though, L and H will be at least similar to each other when compared to the width W, which is less than both. The input face 12 has a height dimension h and an orthogonal breadth direction b. The width W and height H of the nanostructure 20 lie at some angle to the height h and the breadth b; this sets the orientation of the nanopore which is defined as lying along the height direction (major axis). Either of H and W can be parallel to either of h or b, or can be arranged at any angle between the parallel alignments. This orientation (direction of the major axis H) is the direction (azimuth) of the slow axis of the birefringence offered by the nanostructure comprising the nanopore. The orientation is set by the polarisation E of the incident light beam, where W is parallel to E and H is perpendicular to E. Hence, rotation of the polarisation direction of the writing light beam controls the slow axis direction of the generated birefringence. The length L of the nanopore 20, being the dimension along the optical propagation direction, partly determines the total retardance available from the birefringence, and can be varied by controlling the amount of optical energy applied to form the nanopores. The contribution of the nanopore shape to the retardance varies by nanopore volume and the ratio between W and H. The overall total retardance depends also on the density of the nanopores and the length of the region or volume containing the nanopores. The total energy can be modified by changing parameters including the pulse duration, individual pulse energy, pulse repetition rate, number of pulses and numerical aperture of the pulse focusing. Hence, both the retardance and the slow axis orientation of the birefringence provided by a nanostructure can be readily controlled.

Figure 3:
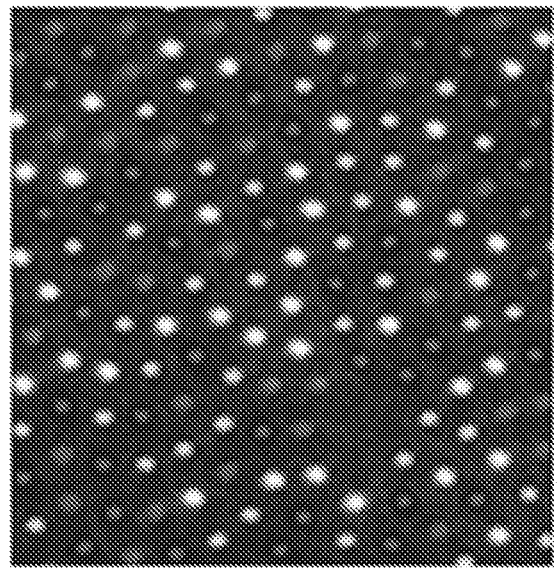
FIG. 3 shows a birefringence image of discrete nanostructures of different birefringence formed in a substrate.

FIG. 3 shows a birefringence image of an example of type II modification, comprising a plurality of dots written inside silica. Each dot comprises a nanograting composed of a plurality of nanopores assembled into a grating structure (so each dot might be considered as a nanostructure, for example), and may make up an individual voxel in a data storage element, for example. The different brightnesses of the dots in the image arises from the different slow axes offered by the different nanostructures, and the different diameters of the dots indicate different values of retardance. Each dot is written separately by applying ultrashort pulses of laser light focused to the desired location in the silica substrate. The orientation of the slow axis of the birefringence is set by the orientation of the polarisation of the laser light, and the magnitude of the retardance can be set at least in part by the total number of pulses and the energy per pulse, combining to give a total optical energy delivered at that location.

For both type II structures and type X structures, one can apply a multiplicity of ultrashort laser pulses to the substrate material, in order to create a consistent and uniform birefringence [7]. For example, about 10 or 50 or 100 pulses or more might be used. The laser light is typically linearly polarised, where a defined polarisation direction is required in order to give the nanostructure the desired anisotropic character that produces the desired birefringence. In the case of type X, the polarisation changes the nanopores into an oblate spheroidal shape to achieve the optical anisotropy, while for type II, the polarisation defines the alignment of the nanograting. The polarised light has an anisotropic electric field distribution which is enhanced at the equators of the initially spherical nanopores induced in the substrate material by the laser pulses and causes the spheres to grow into oblate shapes with a longer dimension oriented perpendicular to the polarisation direction of the laser light.

This use of multiple pulses for writing presents an obstacle to the goal of increasing the speed of writing of the nanostructures, which is generally important, and particularly relevant in the context of realising efficient data storage from 5D optical data elements. Accordingly, a two-stage writing method has been previously proposed [5] that enables faster writing by creating birefringence-providing nanopores at a single location, such as for a data storage voxel, with as few as one single laser pulse. In a first stage, a plurality of ultrashort pulses of circularly polarised laser light are focused into a substrate of transparent material. The pulses generate nanopores, as expected, but owing to the use of circularly polarised light which lacks any enhanced direction of the electrical field, the nanopores retain a substantially spherical shape, and the distribution of the nanopores lacks any directional dependence. Hence, the nanostructures are optically isotropic, and lack the anisotropic character (shape and/or distribution of the nanopores) required to provide birefringence. This creates an intermediate state in the substrate which is primed or seeded for conversion or modification into a birefringent anisotropic structure. Hence, the first stage can be considered as a seeding stage, with the applied pulses being seeding pulses. The intermediate stage is a reactive condition of the substrate material, in that the material is able to react to further applied light pulses in order to evolve into an anisotropic nanostructure with birefringence. In a second stage, one single pulse (or in some embodiments a small number of pulses) is focused into the volume of the substrate in which the reactive state spherical nanopores have been formed in the first stage. In the second stage, however, the light has a non-circular polarisation, by which it is meant that the light is polarised with a linear polarisation or an elliptical polarisation (rather than being unpolarised). This polarisation state provides the appropriate electric field shape to push or evolve the spherical nanopores into an oblate spheroidal shape or into a grating alignment or assembly, so that birefringence is achieved. Since this second stage creates the final desired nanopore structure, it can be considered as a writing stage.

Figure 4:
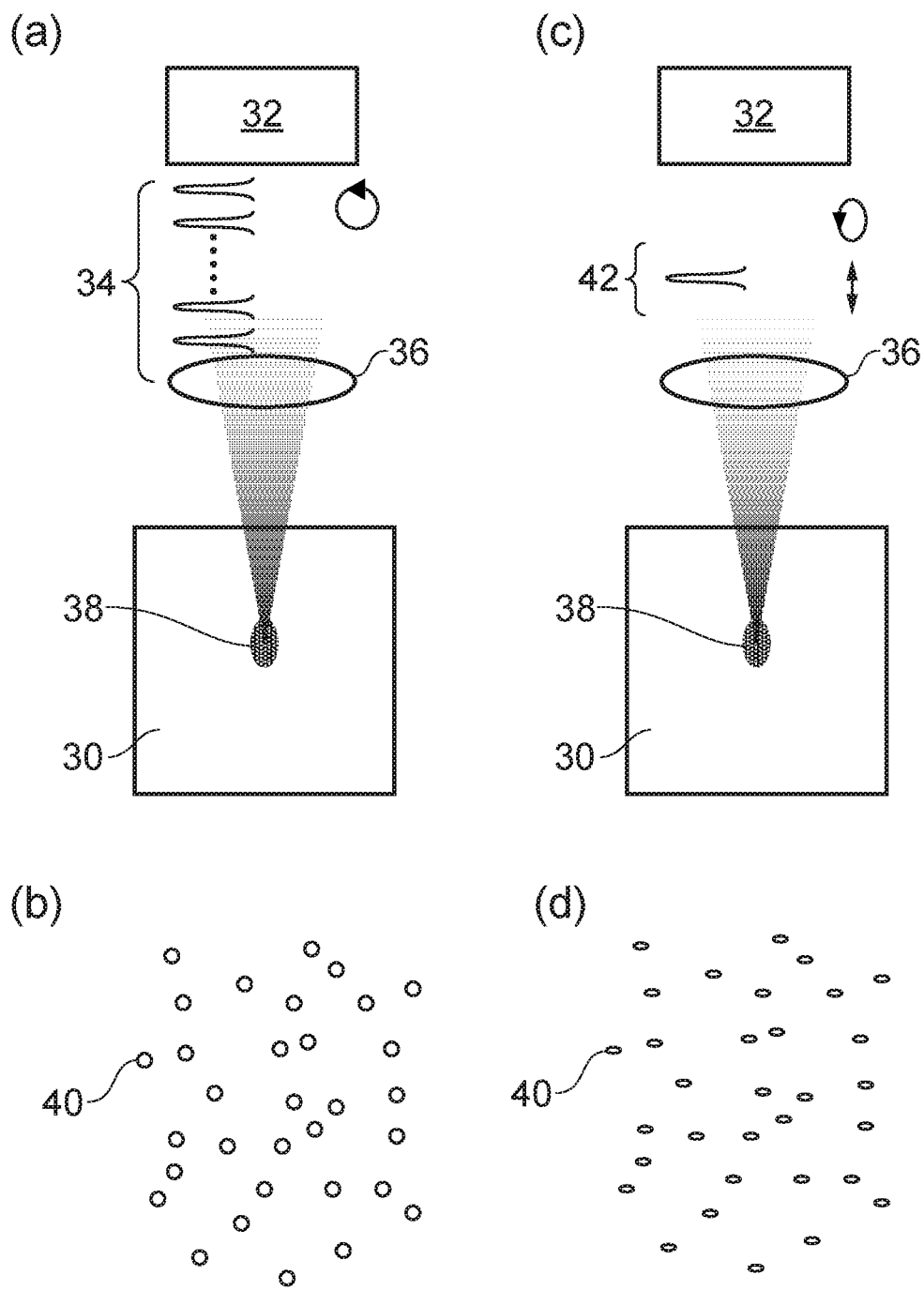
FIG. 4 shows a simplified schematic representation of first and second stages in a previously known method for creating nanostructures in a substrate.

FIG. 4 shows a highly simplified schematic representation of the first and second stages of the previously proposed method. In FIG. 4(a), an optical source in the form of a laser 32 emits a sequence of femtosecond pulses 34 of circularly polarised light. Using a lens 36 or other focusing arrangement, the pulses 34 are focused to a focal point or region 38 inside a substrate 30 of a suitable optically transparent material such as silica. This process forms a plurality of randomly distributed spherical nanopores 40 within the silica, in the volume of the focal region 38, as shown in FIG. 4(b). The plurality of nanopores 40 formed by this application of pulses to a single region 38 in the substrate can be considered to be a nanostructure. In this way, the silica glass has been subjected to a seeding stage by the application of seeding pulses, and modified into a reactive state or condition in that volume within the substrate, being a state in which the silica is sensitive to, or able to react to, polarised light which will further modify its structure. In FIG. 4(c), immediately following the seeding stage of FIG. 4(a) or at some later time, the optical source 32 (or alternatively a different optical source) provides a single femtosecond pulse 42, of non-circularly polarised light (so, linearly polarised or elliptically polarised). The pulse 42 is focused by a focusing arrangement to the same focal region or volume 38 in the substrate 30. Its polarised nature acts to transform the nanopores 40 in the spherical shape of the reactive state by changing their shape to oblate spheroids, as shown in FIG. 4(d). The short dimension of the oblate shape is parallel to the polarisation axis of the non-circularly polarised light. This second stage can be considered as a writing stage in which one, or in some cases, up to about ten, writing pulses are delivered. The transformation of the nanopores into an anisotropic, oblate shape imparts birefringence to the nanopores, so that a birefringent nanostructure is formed in the region 38.

The orientation of the nanopores dictates the direction of the slow axis of the birefringence, and since the short dimension of the oblate shape is formed parallel to the polarisation axis of the writing light pulses, the orientation of the polarisation axis can be controlled in order to set the birefringence axis. In addition, the retardance value of the birefringence can be controlled by modification of the writing light pulses. It has been found that the amount of retardance can be increased by applying a larger amount of optical energy via the writing light pulses [5]. While this may be done by increasing the optical power of the laser beam delivering the writing pulses, an alternative is to apply more than one writing pulse to the same region. Furthermore, it has additionally been found that the amount of retardance depends on the degree of ellipticity of the non-circular polarisation of the writing light beam [8]. The larger the degree of ellipticity, that is, the closer the polarisation is to being circular, the lower the retardance value. Hence, there are a number of parameters of the writing beam which can varied in order to define a required retardance value for a birefringent nanostructure.

These effects can be appreciated with reference to the following Figures.

Figure 5:
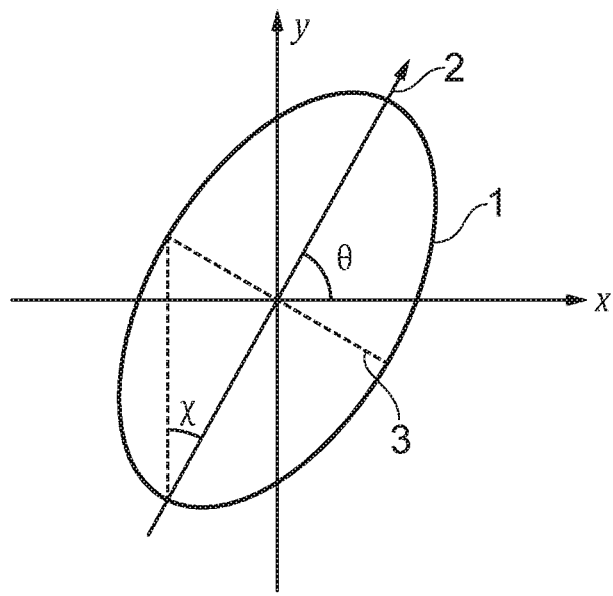
FIG. 5 shows a diagrammatic representation of elliptically polarised light with various parameters indicated.

FIG. 5 shows a diagram of an ellipse describing elliptically polarised light, in order to explain relevant parameters. The light propagates in the z-direction, into the page, and the elliptical polarisation lies in the x-y plane perpendicular to the propagation direction, namely the plane of the page. The ellipse 1 indicates the trajectory of the electric vector of the elliptically polarised light. In the conventional manner, the ellipse has a major (long) axis 2, and a minor (short) axis 3. The major axis 2 is designated as the polarisation axis, or the direction or orientation of the polarisation. The major axis 2 lies at an angle θ to the x-axis, and this angle is designated as the azimuth of the major axis, in order to describe the polarisation orientation. When creating an anisotropic (oblate spheroidal) nanopore, the larger dimension H (see FIG. 2) of the oblate spheroidal nanopore forms perpendicularly to the polarisation orientation (major axis direction in the case of elliptical polarisation) of the writing light pulses. The dimension H defines the slow axis of the birefringence of the nanostructure, so the birefringence slow axis is perpendicular to the writing pulse polarisation direction. Hence, the slow axis orientation of written nanostructures can be set by adjusting the polarisation direction of the writing pulse or pulses. This is applicable for creating Type X nanostructures, but elliptical polarisations can also be used to achieve Type II nanostructures.

The ellipse 1 is also described by an angle x, which is the angle between the major axis 2 and a line connecting the intersection of the major axis with the ellipse boundary and the intersection of the minor axis with the ellipse boundary. This angle specifies the ellipticity of the ellipse, which is defined as tan (x). A value of 1 for the ellipticity indicates that the ellipse is actually a circle, so the light is circularly polarised. A value of 0 for the ellipticity indicates that the ellipse has been reduced to a line, so the light is linearly polarised. Values greater than 0 indicate non-linearly polarised light. Values up to 1 indicate elliptically polarised light, where a value of 1 is a circular polarisation and a circle might be considered as a special case of an ellipse. However, circularly polarised light pulses produce isotropically shaped substantially spherical nanopores which do not provide any birefringence, as used in the seeding stage of the method described above. Typically, then, if the ellipticity is designated as "e", in order to create birefringent nanostructures via a writing stage, the writing light pulses have an elliptical polarisation in the range $0 < e < 1$. More generally, the light pulses have a non-circular polarisation, including linearly and elliptically polarised light, so the ellipticity is in the range $0 \le e < 1$.

Figure 6:
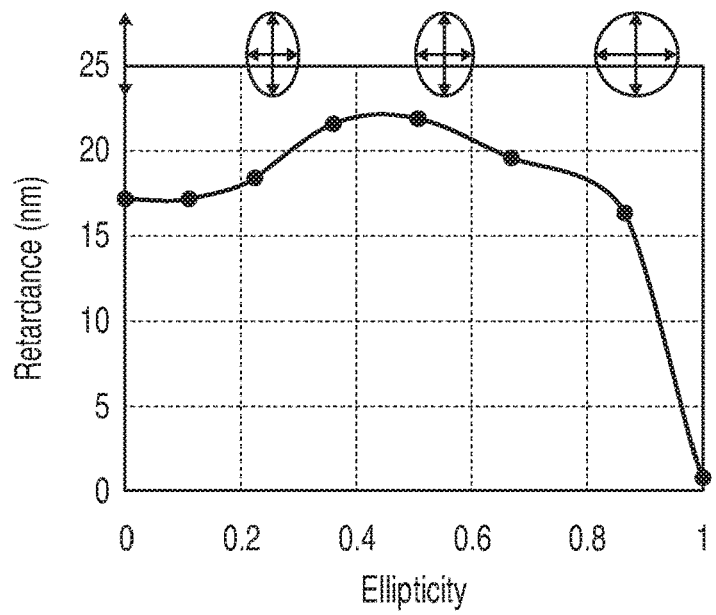
FIG. 6 shows a graph of the variation of birefringent retardance available from varying the ellipticity of a writing light beam used to create nanostructures in a substrate.

FIG. 6 shows a graph of the dependence of retardance on ellipticity of the writing pulses as determined by prior experiment [8]. Ellipticity ranges from 0, corresponding to linear polarisation, to 1, corresponding to circularly polarisation, as discussed above with regard to FIG. 5. To obtain the data of FIG. 6, five elliptically polarised writing pulses were applied to a silica substrate which had previously been prepared with isotropic spherical nanopores by the application of multiple seeding pulses of circularly polarised light according to a two-stage approach as described above [5], to form anisotropic nanopores for a Type X modification. The graph shows how the retardance varies across the full range of ellipticity, $0 \le e < 1$. From this it is clear that significant changes in the value of the retardance are produced by altering the ellipticity. Accordingly, the amount of birefringence of a nanostructure can be controlled by the ellipticity of the non-circularly polarised writing light pulses used to create the nanopores.

Figure 7:
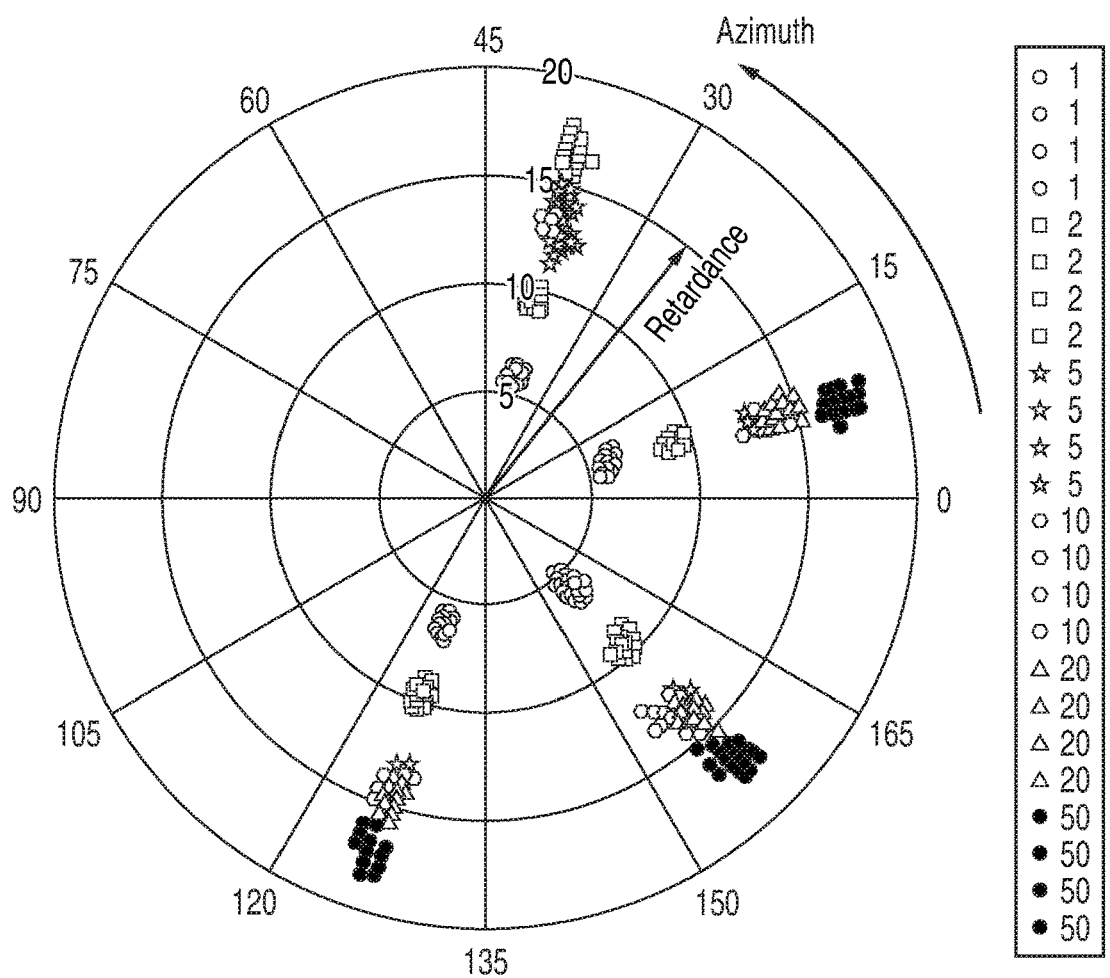
FIG. 7 shows a plot of measured birefringence azimuth and retardance values for nanostructures written using the method of FIG. 4, indicating how these parameters can be varied by changing writing pulse parameters.

FIG. 7 shows a graph plotting retardance value against azimuth of the slow axis for a plurality of birefringent nanostructures fabricated using the known two-stage seeding-plus-writing approach as described above [5]. In each case, the seeding stage comprised 150 seeding pulses and the writing stage variously comprised one pulse, two pulses, five pulses, ten pulses, 20 pulses or 50 pulses. A key indicating the symbols used for the various numbers of writing pulses is shown to the right of the graph. The results for one writing pulse appear as clusters of data points closest to the centre of the graph, with a retardance value of about 7 nm. Clusters of data points for two writing pulses show a retardance value of about 9 nm, reflecting the increase in retardance achievable from the extra energy provided by additional writing pulses. The data for the remaining writing pulse numbers are grouped together from about 12 nm of retardance outwards. Five writing pulses provided about 14 nm of retardance, with similar values obtainable for ten writing pulses. The larger writing pulse quantities of 20 pulses and 50 pulses show a further increase in retardance.

Accordingly, a two-stage seeding and writing method can be used to encode data in an optical data storage element by forming birefringent nanostructures as separate voxels arranged in a substrate in two or three dimensions, and having birefringent properties (retardance value and slow axis orientation) defined by the non-circular polarisation properties of, and the number of, the writing light beam pulses.

The two-stage seeding and writing technique has some advantages, in particular that the writing stage can be very fast owing to the ability to use only one single pulse to form the birefringence in each nanostructure. However, the overall fabrication of an optical element can be considered time-consuming, since the total number of pulses, that is, the plurality of seeding pulses plus the one or more writing pulses, is still relatively high. For example, for a laser light wavelength of 1030 nm focused into the substrate with a 0.16 numerical aperture lens, 40 or more writing pulses are typically required at each location [5].

In order to address this, the present disclosure proposes the use of circularly polarised seeding pulses and non-circularly polarised writing pulses to write birefringent nanostructures into a substrate via a different configuration of the laser beam used to deliver the pulses. The beam configuration allows the seeding and the writing stages to be performed in parallel, thereby reducing the time required to form a given number of nanostructures, which may be, for example, voxels for optical data storage (although other purposes are also contemplated).

The technique proposes the formation and simultaneous application of multiple focused spots or beams of circularly polarised ultrashort pulsed laser light plus a single focused spot or beam of non-circularly polarised ultrashort pulsed laser light, using a group of spots or beams which are scanned over the surface of a substrate in order to deliver multiple pulses of seeding light and then one or more pulses of writing light to each desired location in the substrate, for example at each voxel location in order to write data into the substrate. A relatively modest number of seeding beams can be utilised, for example between two and ten, such as five.

By scanning the beam group over the substrate (or otherwise causing relative movement between the beams and the substrate) and applying one or more pulses from each beam at each of multiple positions corresponding to desired locations at which nanostructures are required, each location receives firstly a plurality of seeding pulses accumulated from exposure to each seeding beam in turn, and subsequently one or more writing pulses as the scanning movement brings the writing beam into alignment with each location that has been previously seeded by multiple seeding pulses.

This arrangement of seeding and writing in parallel has been enabled by research which found that adequate seeding can be achieved using smaller numbers of seeding pulses than were previously thought necessary, and the recognition that a beam group with suitable beam parameters and appropriate spacings between the spots can be conveniently formed using holographic spatial light modulation of a laser beam (although other beam group generation techniques are not excluded).

Experiments have determined that fewer seeding pulses than the 40 or so identified in earlier work [5] can be applied to produce adequate seeding. By utilising a tighter focus for the seeding beam and moving to a shorter wavelength, a smaller number of pulses can be sufficient. This enables enough pulses to be applied at each location by the scanning of a relatively small group of seeding beams, each delivering in turn one or a few pulses to the location. For example, a number of seeding pulses in the range of 8 to 10 pulses, at a wavelength of 515 nm and focused with a lens of numerical aperture 0.55, has produced good seeding in silica substrates, by which is meant the creation of suitable substantially spherical nanopores that are randomly distributed (that is, lacking any overall alignment or assembly).

Figure 8:
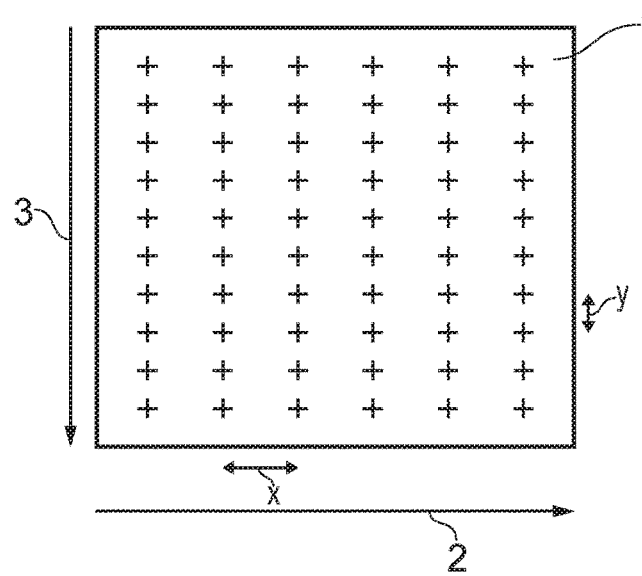
FIG. 8 shows a schematic plan view of a substrate surface and the intended positions of an array of nanostructures to be written into the substrate.

FIG. 8 shows a schematic plan view of a portion of a surface of a substrate 1 in which it is desired to write a plurality of nanostructured voxels. The voxel positions are indicated as "+", they are spaced apart in a first direction 2 by a distance or separation X and in second direction 3 orthogonal to the first direction 2 by a distance or separation Y, which may or may not be equal to X. This defines a two-dimensional array of voxels at a depth within the substrate, determined by the distance of the focus of the beams used to create the nanostructures below the substrate surface. Further focal distances can be used to form additional two-dimensional voxel arrays at different depths in the substrate, in order to define a three-dimensional array of voxels.

Figure 9A:
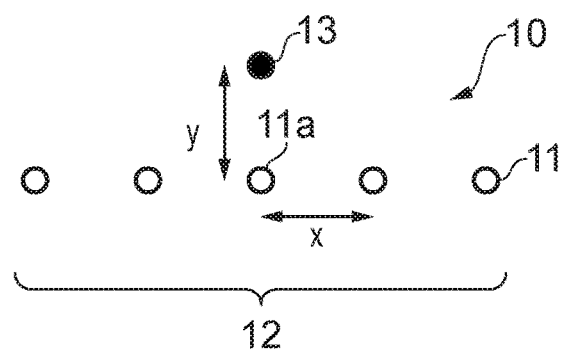
FIG. 9A shows a schematic representation of an example group of laser beams comprising five seeding beams and a writing beam suitable for use in a method disclosed herein.

FIG. 9A shows a schematic plan view of a first example laser beam group that may be used to write a voxel array such as that shown in FIG. 8 (not on the same scale as FIG. 8). The group 10 comprises five spots or beams 11 arranged along a line 12 and spaced apart by the distance X. These spots 11 are focused beams of femtosecond pulsed laser light and comprise seeding pulses, for seeding volumes in a substrate by creating substantially circular nanopores with a random distribution. The spots 11 therefore comprise circularly polarised light. They are substantially identical in terms of wavelength, pulse duration, pulse repetition rate, pulse timing, focal spot size and focal depth. Although this example shows five seeding beams, other number of seeding beams may be used and arranged along the line 12 with substantially equal spacing, for example one, two, three, four, six, seven, eight, nine, ten or more.

The group 10 further comprises a writing spot or beam 13. The writing beam 13 is offset from the line 12 of seeding beams 11 by the distance Y, along a direction orthogonal to the line 12. In this example, the writing beam 13 is aligned with the central seeding beam 11*a*, and is therefore spaced from the central seeding beam 11*a* by the distance Y. in other examples, the writing beam 13 may be aligned with other of the seeding beams 11 along the line 12. However, an arrangement in which the line 12 comprises an odd number of seeding beams 11 and the writing beam is aligned with the central seeding beam 11*a* can be conveniently generated using holographic beam shaping techniques, which is described in more detail below. The writing beam comprises non-circularly polarised light (linear polarisation or elliptical polarisation) in order to induce birefringence in the substrate by transforming spherical nanopores formed by the seeding beams into oblate spheroidal nanopores, or by altering the distribution of the nanopores from random to aligned, where the alignment is along the direction perpendicular to the polarisation. Otherwise, the writing beam can be substantially identical to the seeding beams in terms of wavelength, pulse duration, pulse repetition rate, pulse timing, focal spot size and focal depth.

Figure 9B:
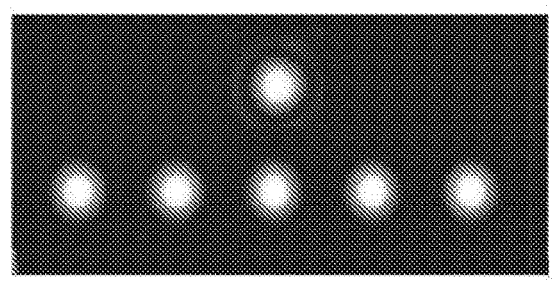
FIG. 9B shows a photographic image of an actual beam group configured as in the FIG. 9A example.

FIG. 9B shows a photographic image of an example beam group comprising five seeding beams arranged in a line and one writing beam displaced upwardly from the line of seeding beams, as in the FIG. 9A example. In an actual beam group, the spacing in the X direction, between the seeding beams, might be about 3 μm and the spacing in the Y direction, between the line of seeding beams and the writing beam, might be about 1 μm, although these values are purely exemplary.

In order to achieve writing of the nanostructures in a substrate, the beam group is moved or scanned over the surface of a substrate of transparent material, such as silica (alternatively the substrate may be moved, or both the beam group and the substrate may be moved, in order to provided relative translation). When the beam group is aligned at a first position in which the individual beams in the line of seeding beams are directed at volumes in the substrate where voxels are required, one or more pulses are applied from each beam to the substrate. The beam group is then translated along a first direction which is parallel to the length of the line of seeding beams, by a distance equal to the spacing X. This translates the seeding beams so that the first beam occupies a new volume, and the other four beams are directed at volumes which received seeding pulses in the previous application of pulses to the substrate. In this new position, one or more pulses are applied from each beam to the substrate.

This is repeated along the full dimension of the substrate, such that the beam group is advanced by the distance X between each application of one or more pulses. The number of voxel volumes in the substrate along the X direction is greater or very much greater than the number of seeding beams in the beam group, so that (expect for a few volumes at the edges of the substrate) each volume receives a plurality of pulses comprising one or more pulses from each seeding beam. For example, if one pulse is applied for the beam group per position, each volume in the substrate is seeded by five pulses.

The scanning or relative movement may be carried out step-wise, so that the beam group is halted at each position, and the required number of pulses applied. Alternatively it may be continuous if the speed of relative movement is matched to the pulse repetition rate so that pulses are emitted as the beam group position coincides with the voxel volume locations.

After scanning along the first direction across the width of the substrate, the beam group is shifted in the second direction by the distance Y, and the application of pulses at separations of the distance X is repeated across the substrate, in order to seed a second row of voxel volumes. The shifting is in a direction that brings the writing beam into alignment with the previously seeded row. Therefore (again excepting a few volumes at the substrate edges), each position of the beam group brings the writing beam into alignment with a seeded voxel volume that was formed during the previous scan across the first direction. Hence, the application of one or more pulses from the beam group delivers one or more writing pulses to a seeded volume comprising spherical nanopores, and the seeded volume is transformed into a birefringent nanostructure in the manner previously discussed.

This procedure of scanning along the first direction by X-sized increments and shifting in the second direction by Y-sized increments before repeating the first direction scanning is repeated over the whole array of desired voxel volumes, so that, subject to voxels at edge positions which may receive fewer seeding pulses and/or no writing pulse, a nanostructure comprising oblate spherical nanopores is written in each voxel volume.

Figure 10:
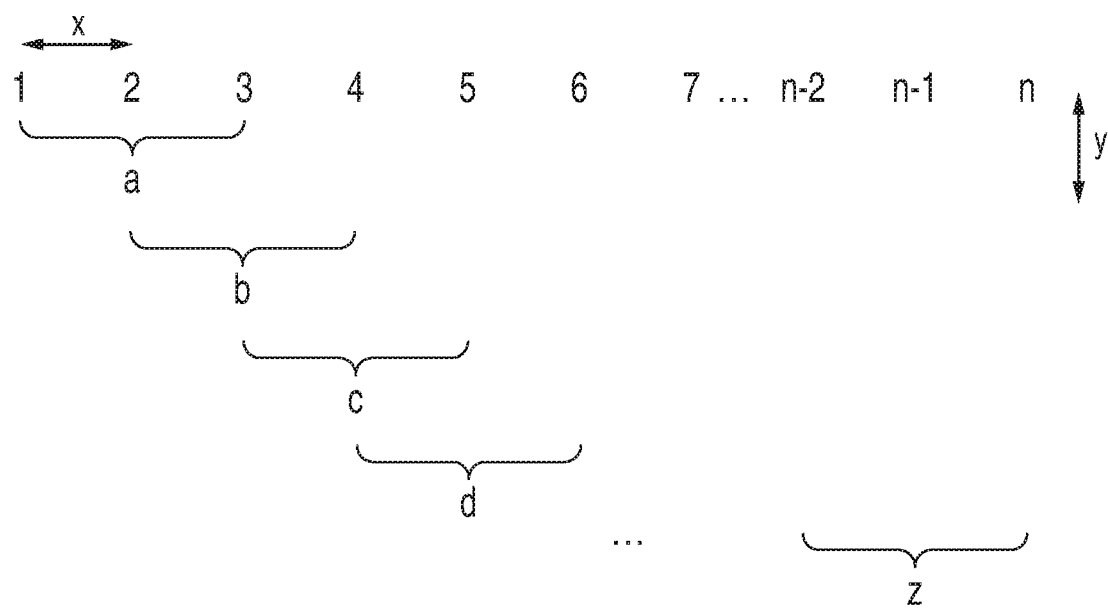
FIG. 10 shows a highly schematic depiction of positioning steps for a laser beam group to enable creation of a row of seeded nanostructures within a substrate according to a method disclosed herein.

FIG. 10 shows a highly schematic depiction of steps in scanning a beam group across a substrate in the first direction, adjacent voxel volumes 1 to n being separated by the distance X. For simplicity, assume the beam group comprises three seeding beams in a line spaced apart from one another by the distance X, plus a writing beam offset orthogonally from the central seeding beam. For each position of the beam group, one pulse is applied from each beam, and in this example, three pulses is deemed sufficient for seeding. At a first position a, the seeding beams apply one pulse to each of voxel volumes 1, 2 and 3. The scan moves a distance X to position b, where the seeding beams apply one pulse to each of voxel volumes 2, 3 and 4. Hence, volumes 2 and 3 have each now received two pulses. At a next position c, the seeding beams apply one pulse to each of voxel volumes 3, 4 and 5. Volume 3 has now received three pulses. At a next position d, volume 4 receives a third pulse. This repeats along the line to the final position z, where volumes n-2, n-1 and n each receive one pulse. Volume n-2 is the last volume along the line to receive 3 pulses, having previously been exposed to the seeding beams at position z-2 and z-1. The edge volumes 1 and n each receive only one pulse, from positions a and z respectively, while volumes 2 and n-1 each receive two pulses from positions a and b, and z-1 and z respectively. Accordingly, most of the row of voxel volumes receives three pulses, and is seeded by the creation of spherical nanopores. To mitigate these edge effects and ensure that all voxel volumes are seeded with the same number of pulses, the first or first few and last or last few positions of the beam group may be arranged to overhang the edge of substrate or the edge of the area in which nanostructures are to be created so that pulses from the ends of the seeding beam line miss the area of interest.

When a next row of voxel volumes a distance Y below the row shown in FIG. 10 is scanned with the beam group from position a to position z, each of the voxel volumes in the row shown in FIG. 10 except the end voxels 1 and n are exposed in turn to the writing beam, and receive one writing pulse. This converts the isotropic nanostructures of the seeded volumes into anisotropic, birefringent nanostructures. For example, spherical nanopores are converted into oblate nanopores in the case of Type X nanostructures.

As explained above, if the writing beam polarisation direction is changed from position to position, a different birefringence slow axis orientation can be written at the different voxel volumes. Similarly, if the writing beam polarisation ellipticity is changed from position to position, a different retardance level can be written at the different voxel positions. In this way, data can be encoded within the substrate in five dimensions, as previously explained.

If one pulse is applied from each beam in the beam group, each voxel volume receives the same number of seeding pulses as there are seeding beams (subject to the edge effects noted above), one pulse from each seeding beam in turn. For y seeding beams, each volume receives y pulses. Therefore, to increase the number of seeding pulses per volume, a larger number of seeding beams may be provided in the beam group. However, this increases the number of inadequately seeded volumes at the ends of a scanning row. An alternative is to apply more than one pulse from each beam at each position of the beam group. For example, two, three, four, five, six, seven, eight, nine, ten or more pulses may be applied at each position. In this way, for y seeding beams and m pulses per position of the beam group, each volume receives y×m seeding pulses. A larger number of pulses necessarily makes for a longer overall writing time for a substrate, however, thereby counteracting some advantage of the process. According, a more modest quantity of pulses per position may be preferred, for example, not more than five, such as three pulses or four pulses.

Similarly, while one single writing pulse can be sufficient to create the required nanostructure in a voxel volume, more than one pulse may be applied. This can increase the level of retardance of the birefringent structure. This could be used to write stronger birefringence at all volumes if the same quantity of writing pulses is applied at each position. Alternatively, if the number of writing pulses is varied with position, the level of retardance can be varied for different voxels, for the purpose of encoding data.

In some embodiments, the same number of pulses is applied for every beam in the beam group at a position relative to the substrate, and optionally also the same number at every position. Alternatively, at a position, the number of applied seeding pulses per seeding beam may differ from the number of applied writing pulses from the writing beam, and again, this may differ between positions.

Figure 11:
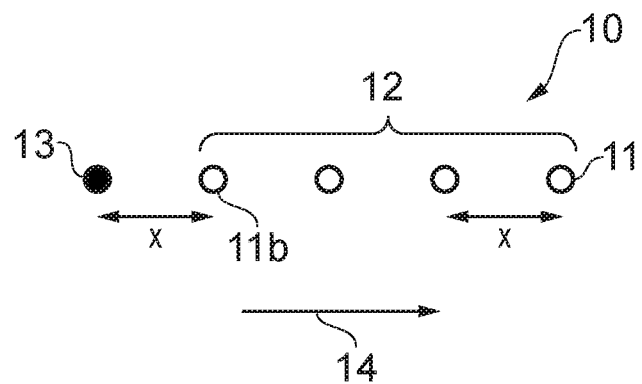
FIG. 11 shows a schematic representation of a further example group of laser beams suitable for use in a method disclosed herein, comprising four seeding beams and a writing beam.

FIG. 11 shows a schematic representation of a second example beam group configuration. This example features a line 12 of four seeding beams 11, and a writing beam 13 which is displaced from an end one 11b of the seeding beams 11 by the same distance X as the seeding beam separation. Again during scanning of the beam group, the group is moved parallel to the line 12 of seeding beams 11, advancing in a direction 14 (the first direction with respect to the substrate) so that the writing beam 13 is the last beam in the group. In this way, the writing and the seeding stages take place along a same row of voxel volumes for a scan along a given voxel row (in contrast to the previously described arrangement in which writing occurs in a voxel row seeded immediately before the currently scanned row). Each voxel volume along the row receives four (or 4×m) pulses from the seeding beams before having a writing beam pulse or pulses applied to it at the next beam group position. A wholly linear beam group such as this example puts no constraint on the Y spacing of the voxels in the array since it is not set by the separation of the writing beam from the seeding beam line. The Y spacing may therefore be made smaller than might be possible owing to physical constraints on the beam group, for example, or may be varied throughout the array. Additionally, a linear beam group can be used to write a single line of voxels only, since there is no need for additional movement in the second direction in order to achieve the writing step.

Figure 12:
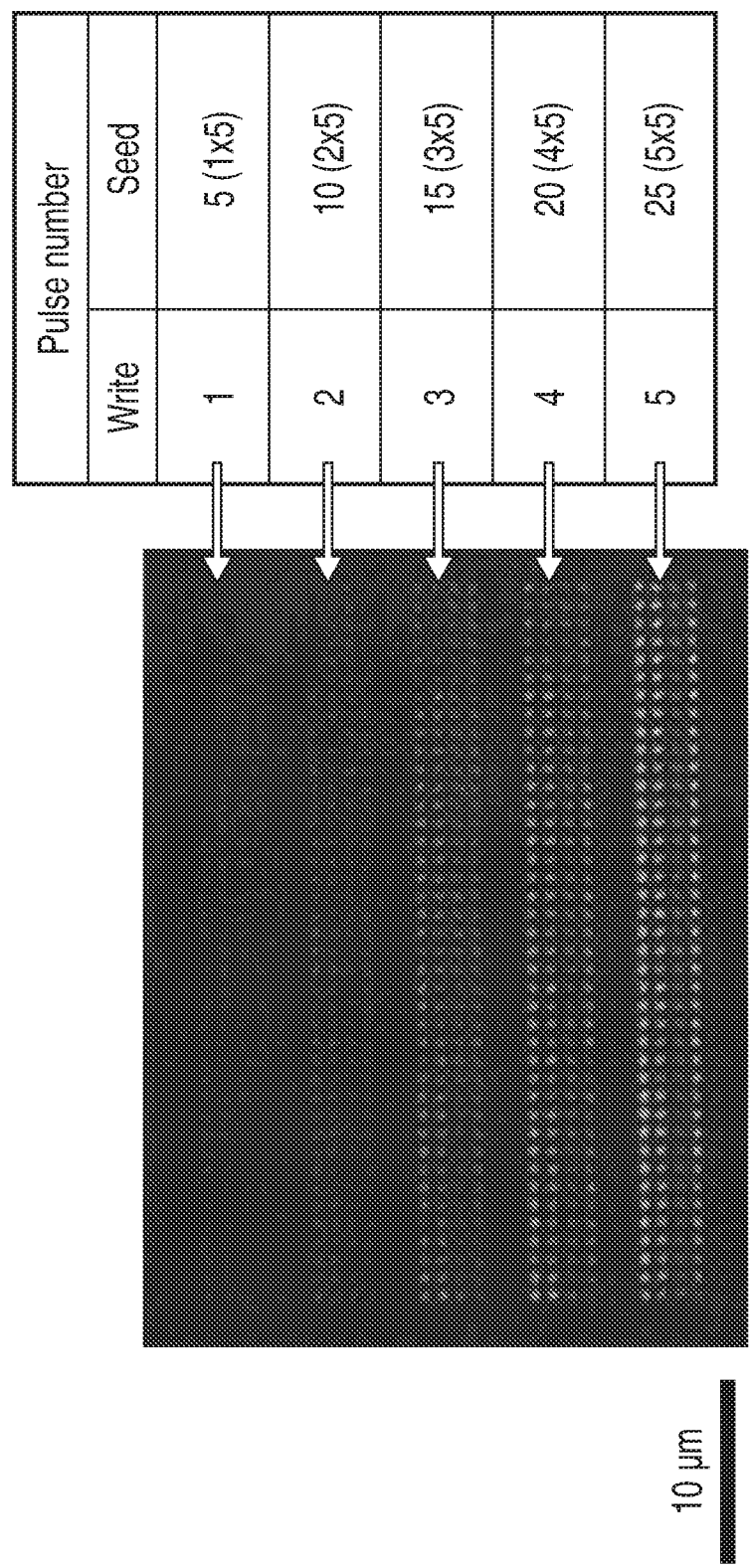
FIG. 12 shows a birefringence image of a substrate with birefringent nanostructures written into it using methods according to examples disclosed herein.

FIG. 12 shows a birefringence image of a silica substrate written with various regions of birefringent nanostructure using a method as described above. The beam group comprised a linear set (line) of five seeding pulses plus one writing pulse offset laterally from the central seeding pulse, as in the examples of FIGS. 9A and 9B. Five groups of nanostructures were formed, with different numbers of pulses used for each structure; these are indicated in the accompanying table. For each group the beam parameters were identical: 17 nJ per pulse, 1 MHz pulse repetition rate, 190 fs pulse duration, 515 nm wavelength and 0.55 numerical aperture focusing. The beam group was configured to achieve voxel spacing within each group of nanostructures of 1 μm.

Within each group, all voxels were created with the same number of pulses from each beam in the beam group at each beam group position, ranging from 1 to 5. The total number of seed pulses per voxel therefore ranged from 5 to 25 (y×m as above). Each group comprises four rows of voxels, with each row written to have a different birefringence slow axis orientation. This is apparent from the different shades of the imaged voxels. The group at the top of the substrate was formed with one pulse per position, and shows a faint birefringence. The birefringence increases with increasing number of pulses per position, with birefringence being very clearly apparent from three pulses and above, corresponding to a total of 15, 20 or 25 seeding pulses. Not only does this demonstrate that the proposed technique can create birefringent nanostructures with a much lower total number of pulses (seeding plus writing) than with previous techniques, but also shows how the amount of birefringence (retardance level) can be tailored by varying the number of pulses.

A beam group appropriate for use in a method as described herein can be conveniently generated from a single optical source configured to output ultrafast pulses of laser light using holographic beam shaping in order to form the line of seeding pulses. In this approach, part of a laser beam output from the source and allocated for the seeding pulses is passed through a spatial light modulator in the form of a hologram. The hologram may be a liquid crystal device, for example, controlled by computer programming to generate an appropriate hologram patterned in order to modulate the spatial distribution of the light beam into the required linear array of beams. The light beam is incident onto the hologram and reflected from it or transmitted through it in the modulated form. Focusing of the modulated light beam enables the generation of the closely spaced multiple focal spots required for the seeding pulses. The technique of holographic spatial light modulation is established [9, 10], and will not be described in further detail here.

Figure 13A:
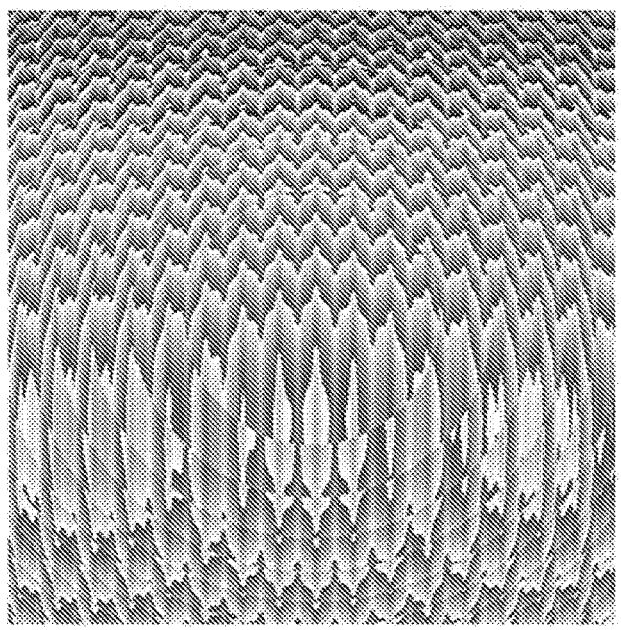
FIG. 13A shows an image of a hologram suitable for use in patterning a spatial light modulator for forming a line of seeding beams for a laser beam group for use in a method disclosed herein.
Figure 13B:
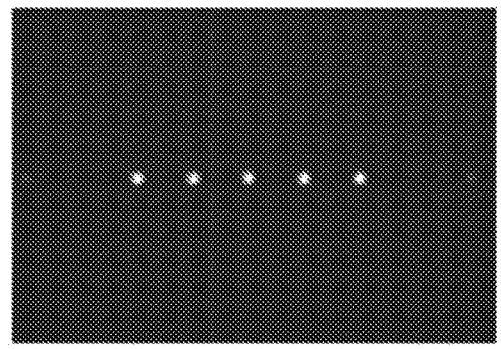
FIG. 13B shows a computer simulated image of a line of five seeding beams generatable using the hologram of FIG. 13A.

FIG. 13A shows an image of an example hologram suitable for the generation of a line of five equally spaced seeding beams, and FIG. 13B shows a computer-simulated imaged of the line of seeding beams which the hologram of FIG. 13A is configured to generate.

Conveniently, the same laser beam can be used to generate the seeding beams and the writing beam. This ensures the same pulse repetition rate and synchronised pulse timings. To achieve this, the output of the laser source can be divided by a beam splitting arrangement, and part directed to a holographic spatial light modulator and through a polariser to give circular polarisation and multiple seed beams. The other part of the beam is directed through a polarisation controller which imparts an adjustable non-circular polariser of which at least the polarisation axis orientation can be altered, in order to create the writing beam. The seed beams and the writing beams are brought together in the desired spatial arrangement (as in FIG. 9A or FIG. 11, for example), and focused with one or more lens to give the desired focal spot size at the desired depth in the substrate.

Figure 14:
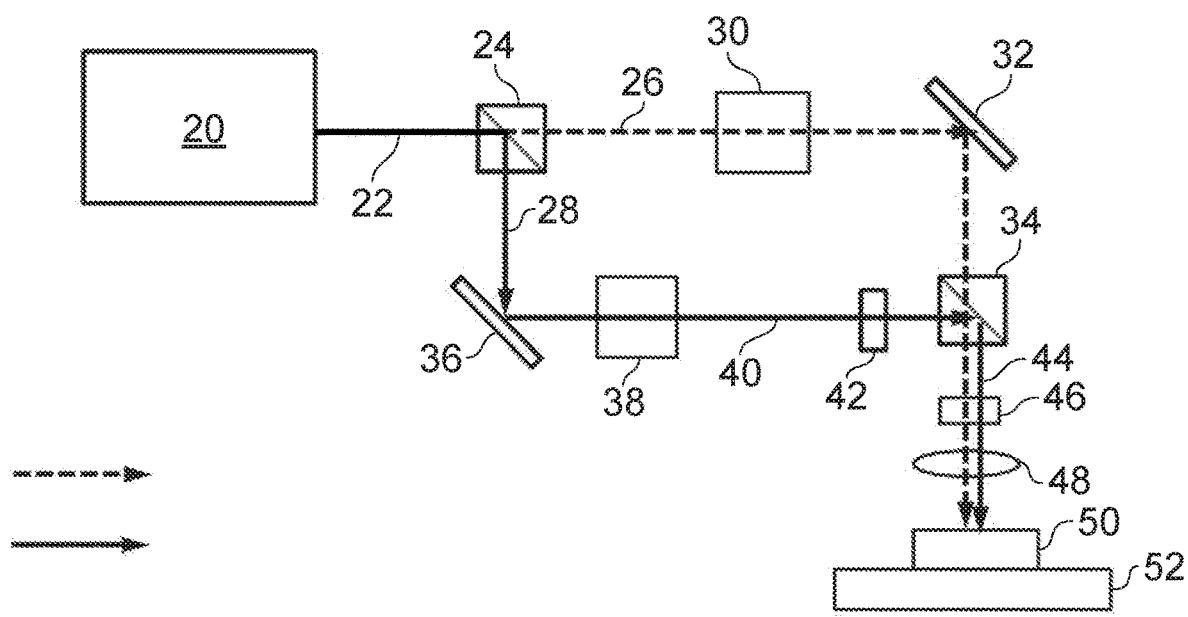
FIG. 14 shows a schematic representation of example apparatus suitable for performing a method as described herein for writing birefringent nanostructures into a substrate.

FIG. 14 shows a schematic representation of an example apparatus for carrying out a method according to examples described herein.

The apparatus comprises an optical source 20 in the form of a laser configured to generate a beam 22 of (typically linearly polarised) laser light comprising femtosecond duration pulses. The output beam 22 is directed to a beam splitter 24 which divides the beam into two parts (the beam energy can be split between the parts as required depending on the relative powers desired for the spots in the beam group). The dotted line indicates the writing beam 26 and the solid line indicates the beam 28 from which the plurality of seeding beams is to be generated. The writing beam 26 passes through a polarisation controller 30 such as an electro-optic modulator (a Pockel's cell, for example) by which the non-circular polarisation state of the writing beam 26 can be set and adjusted (in terms of the polarisation orientation axis, and optionally also the degree of ellipticity e, in a range of $0 \le e < 1$. A mirror 32 changes the writing beam propagation direction towards the intended location of the substrate (if required, depending on the set-up of the apparatus), and the writing beam 26 then is incident on a second beam splitter 34, used as a beam combiner.

The beam 28 for forming the seeding beams is directed by a mirror 36 through a holographic spatial light modulator 38 (which may be a liquid crystal device under computer control, for example) and any required associated imaging optics (lenses) to appropriately focus the input and output of the spatial light modulator 38. The output of the spatial light modulator 38 comprises the multiple seeding light beams 40 disposed in the desired spaced-apart positions along a line. These beams 40 are passed through a quarter wave plate 42 to convert them from linear to circular polarisation, before they reach the second beam splitter 34. The second beam splitter 34 directs the writing beam 26 and the seeding beams 40 together in parallel with the required spatial pattern for the beam group (the writing beam being offset from one of the seeding beams by the distance X or Y as discussed) to form the beam group 44. A grouping in which the writing beam is laterally offset from the line of seeding beams and aligned with a central one of the seeding beams may be most simple to achieve. The beam group is passed through a further waveplate 46 if necessary, before being focused with one or more lenses 48. The focused beams in the beam group 44 are directed to the required depth in a substrate 50 which is mounted on a translation stage 52 to enable the required translation of the beam group relative the substrate surface, that is in a plane parallel to the substrate surface in order for the beam group to access the array of voxel volumes. Further arrays at different depths in the substrate 50 can be created by changing the focal position via the lens 48 or by translating the substrate along the beam propagation direction (orthogonal to the plane of the substrate surface).

The apparatus of FIG. 12 is an example only, and apparatus differently configured to deliver a suitable beam group of pulsed laser beams translatable over the surface of a substrate may alternatively be used. The skilled person will readily appreciate various ways to achieve this.

As noted above good results have been obtained using a laser wavelength of 515 nm, but the invention is not limited in this regard. While wavelengths around this value, such as in the range of 500 nm to 530 nm, may be useful, longer or shorter wavelengths are not excluded, such as in the range of 450 nm to 550 nm, 400 nm to 600 nm, 400 to 700 nm, or longer wavelengths up to and including infrared wavelengths such as in the range 400 nm to 1100 nm. More generally, the wavelength of the laser beam may be at or around 1030 nm, such as within the range of 1000 nm to 1060 nm. Other wavelengths may also be used, including the shorter wavelengths mentioned above such as at or around 515 nm and at or around 343 nm. Hence, the wavelength might be chosen in the range of 340 nm to 1100 nm. Other smaller ranges may be appropriate depending on the other operating parameters, such as in the range of 300 nm to 1000 nm, 400 nm to 1000 nm, 500 nm to 1000 nm, 600 nm to 1000 nm, 700 nm to 1000 nm, 800 nm to 1000 nm, 900 nm to 1000 nm, 300 nm to 900 nm, 400 nm to 900 nm, 500 nm to 900 nm, 600 nm to 900 nm, 700 nm to 900 nm, 800 nm to 900 nm, 300 nm to 800 nm, 400 nm to 800 nm, 500 nm to 800 nm, 600 nm to 800 nm, 700 nm to 800 nm, 300 nm to 700 nm, 400 nm to 700 nm, 500 nm to 700 nm, 600 nm to 700 nm, 300 nm to 600 nm, 400 nm to 600 nm, 500 nm to 600 nm, 300 nm to 500 nm, 400 nm to 500 nm or 300 nm to 400 nm, or any of 300 nm, 400 nm, 500 nm, 600 nm, 700 nm, 800 nm, 900 nm or 1000 nm to 1060 nm or 1100 nm or 1200 nm. Alternatively, the ranges may extend down to 200 nm in some examples. Longer wavelengths may also be used, so that the upper end of the above-listed ranges might instead be 1300 nm, or 1400 nm, or 1500 nm, or 1600 nm, or 1700 nm, or 1800 nm, or 1900 nm, or 2000 nm, or 2100 nm, or 2200 nm, or 2300 nm, or 2400 nm, or 2500 nm. Overall, therefore, the wavelength might lie in the range of 200 nm to 2500 nm. Any suitable laser source can be used to generate the writing beam, but a Ti:sapphire laser, operating to generate a femtosecond output tuneable within the wavelength range of 650 nm to 1100 nm may be used. Also, higher harmonics of this near-infrared range could be used to provide shorter wavelengths such as 515 nm. Another example laser is an ytterbium-doped potassium gadolinium tungstate regenerative amplified laser, modelocked to provide pulses in the femtosecond domain. Other lasers and optical sources operable in the visible and/or near-infrared spectral range could also be used.

The results shown in FIG. 10 were obtained using a beam group focused with a lens of numerical aperture (NA) of 0.55. Relatively tight focusing of this scale may be useful, but other levels of focusing are not excluded, such as NA in the range 0.5-0.6, or 0.45-0.65, or 0.3-0.7, or 0.5-0.7, or focusing outside these ranges if appropriate.

The pulse duration may be about 190 fs as noted, but other pulse durations may be chosen in order to vary the power and/or energy delivered to the substrate. Examples include pulses in the range of 300 to 900 fs, 300 to 400 fs, 300 to 500 fs, 300 to 600 fs, 300 to 700 fs, 300 to 800 fs, 400 to 500 fs, 400 to 600 fs, 400 to 700 fs, 400 to 800 fs, 400 to 900 fs, 500 to 600 fs, 500 to 700 fs, 500 to 800 fs, 500 to 900 fs, 600 to 700 fs, 600 to 800 fs, 600 to 900 fs, 700 to 800 fs, 700 to 900 fs, or 800 to 900 fs. Pulses shorter than 300 fs or longer than 900 fs may also be suitable. For example the pulse duration may be as short as 100 fs or 200 fs, or as long as 1000 fs, so that the duration is chosen to be in a range with a lower limit of 100 fs or 200 fs, and an upper limit of 300 fs, or 400 fs, or 500 fs, or 600 fs, or 700 fs, or 800 fs, or 900 fs, or 1000 fs.

Appropriate values for the pulse energy depend on factors including the pulse duration, the wavelength, and the numerical aperture of the focusing arrangement. For example, the pulse energy may be in the range of 20 nJ to 40 nJ for 515 nm light focused at a numerical aperture of 0.55.

Silica has been mentioned as a suitable material for the optically transparent substrate, but other materials may also be used. The bulk material of the substrate used to form an optical element using the process is a transparent material, meaning that it has a significant transmission for at least some wavelengths across the spectrum from ultraviolet to the near-infrared (roughly 200 nm to 2500 nm). It should have a high transparency at the wavelength used for the seeding laser pulses and the writing laser pulses (which may or may not be obtained from the same laser beam, or otherwise have the same wavelength), and also for the intended light beams to be used with the finished optical element (for reading stored optical data, or to be optically transformed or manipulated by the element). Usefully, the material may be an amorphous glass material. For example, it may be silica (silicon dioxide, $SiO_2$), including fused silica. The silica or other glass material might be doped with other materials to modify its optical properties. Examples of doped or multicomponent glasses may include materials such as $Al_2O_3$, $B_2O_3$, alkaline earth oxides and $Na_2/K_2O$ but other elements and compounds may be used; the disclosure is not limited in this regard. Other materials for the optical element may be any material able to support the laser induced nanostructures, including materials in which nanogratings such as a type II modification or a type X modification have previously been demonstrated. These include multicomponent glasses, $GeO_2$ glass, porous glass, aerogel glass, silicon and silicon materials, semiconductor materials, lithium niobate and other lithium oxide compounds. Other materials are not excluded, however. In the case of doped silica or other materials, the parameters of the laser pulses may require selection to take account of the physical properties of the material, in particular the bandgap and the thermal properties. The nanostructures are formed so as to be embedded within the volume of the material of the optical element. They can be formed in single layer, with a thickness of the layer being in a range of about 50 μm to about 500 μm. Control of the seeding and writing laser pulse parameters and the focusing can create a plurality of layers at different depths in the element (i.e. at different positions along the length of the propagation direction of the seeding and writing pulses). As an example, the optical element may have a thickness on this direction of about 3 mm, although thicker and thinner dimensions can of course be used as convenient.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in the future.

REFERENCES

[1] P G Kazansky, H Inouye, T Mitsuyu, K Miura, J Qiu, K Hirao and F Starrost, Phys. Rev. Lett., vol. 82, 2199-2102, 1999
[2] J Zhang, M Gecevičeius, M Beresna, P G Kazansky, Phys. Rev. Lett., vol. 112(3), 33901, 2014
[3] E Bricchi, B G Klappauf, P G Kazansky, Opt. Lett., vol. 29, 119-201, 2004
[4] S S Fedotov, A G Okhrimchuk, A S Lipatiev, A A Stepko, K I Piyanzina, G Y Shakhgildyan, M Y Presniakov, I S Glebov, S V Lotarev and V N Sigaev, Opt. Lett., vol. 43(4), 851, 2018
[5] GB 1819189.0
[6] C Hnatovskya, R S Taylor, P P Rajeev, E Simova, V R Bhardwaj, D M Rayner and P B Corkum, Appl. Phys. Lett. vol. 87, 014104, 2005
[7] GB 1802497.6
[8] GB 1819193.2
[9] Y Hayasaki, T Sugimoto, A Takita and N Nishida, Appl. Phys. Lett., vol. 87, 031101-1, 2005
[10] K Sakuma, S Hasegawa, H Takahashi, M Ota and Y Hayasaki, Appl. Phys. B, vol. 119, 533-538, 2015

The invention claimed is:

1. A method of fabricating an optical element comprising:
providing a substrate of a transparent material in which is to be formed a plurality of birefringent nanostructures spaced apart in plane substantially parallel to a surface of the substrate in a first direction by a distance X and in a second direction by a distance Y;
generating from the output of a source of femtosecond laser pulses a laser beam group comprising a plurality of focused seeding beams having a circular polarisation and spaced apart along a line by the distance X and a focused writing beam having a non-circular polarisation and spaced apart from one of the seeding beams by the distance Y or the distance X;
directing the laser beam group onto the surface of the substrate at a first position and applying one or more femtosecond laser pulses from each beam to corresponding volumes in the substrate;
repeatedly translating the laser beam group relative to the substrate parallel to the line of seeding beams and along the first direction by the distance X to a next position and applying one or more femtosecond laser pulses from each beam, in order to deliver a plurality of femtosecond laser pulses from the seeding beams to each corresponding volume to create substantially optically isotropic nanostructures in the corresponding volumes;
translating the laser beam group relative to the substrate along the second direction by the distance Y and repeating the repeated translation and application of the femtosecond laser pulses along the first direction; wherein the relative translation of the laser beam group and the substrate aligns the writing beam with successive corresponding volumes in which substantially optically isotropic nanostructures have been created, so that the one or more femtosecond laser pulses applied from the writing beam transform the optically isotropic nanostructure in each corresponding volume into an optically anisotropic nanostructure with optical birefringence.

2. A method according to claim 1, in which the writing beam is spaced apart from the line of seeding beams by the distance Y in a direction orthogonal to the line and aligned with one of the seeding beams, so that the relative translation applies pulses from the writing beam to corresponding volumes to which the seeding beams have been applied at a previous position along the second direction.

3. A method according to claim 2, in which the plurality of focused seeding beams comprises an odd number of seeding beams, and the writing beam is aligned with a central seeding beam in the line of seeding beams.

4. A method according to claim 1, in which the writing beam is spaced apart from a seeding beam at an end of the line of seeding beams by the distance X in a direction along the line of seeding beams, so that the relative translation applies pulses from the writing beam to corresponding volumes to which the seeding beams have been applied at previous positions of a same translation along the first direction.

5. A method according to claim 1, in which the line of focused seeding beams comprises a straight line.

6. A method according to claim 1, in which the plurality of focused seeding beams are generated by use of a hologram to produce spatial light modulation of the output of the femtosecond laser pulse source.

7. A method according to claim 1, in which, at each position, a same number of femtosecond laser pulses is applied from each beam.

8. A method according to claim 7, in which, at each position, one femtosecond laser pulse is applied from each beam.

9. A method according to claim 1, in which, at least some positions, a same number of pulses is applied from each seeding beam and a different number of pulses is applied from the writing beam.

10. A method according to claim 1, comprising delivering a plurality of femtosecond laser pulses from the seeding beams to each corresponding volume in the range of 5 to 25 pulses.

11. A method according to claim 1, in which the output of the source of femtosecond laser pulses has a wavelength in the range of 500 nm to 530 nm.

12. A method according to claim 1, in which the seeding beams and the writing beam are focused with a focusing arrangement having a numerical aperture in the range of 0.5 to 0.6.

13. A method according to claim 1, further comprising selecting, for each corresponding volume, an orientation of the non-circular polarisation of the writing beam for the one or more femtosecond laser pulses applied from the writing beam to the corresponding volume in order to create optically anisotropic nanostructures with an intended orientation, so as to define a particular birefringence slow axis orientation for the optically anisotropic nanostructure.

14. A method according to claim 1, further comprising selecting, for each corresponding volume, an ellipticity of the non-circular polarisation of the writing beam for the one or more femtosecond laser pulse applied from the writing beam to the corresponding volume in order to create optically anisotropic nanostructures with an intended birefringence retardance value.

15. A method according to claim 13, in which the non-circular polarisation of the writing beam is a linear polarisation, with an ellipticity of substantially zero.

16. A method according to claim 13, in which the non-circular polarisation of the writing beam is an elliptical polarisation, with an ellipticity greater than zero and less than 1.

17. A method according to claim 1, further comprising selecting, for each corresponding volume, a number of femtosecond pulses to be applied from the writing beam to the corresponding volume in order to create optically anisotropic nanostructures with an intended birefringence retardance value.

18. A method according to claim 1, in which each optically isotropic nanostructure comprise a plurality of substantially spherical nanopores, and each optically anisotropic nanostructure comprises a plurality of oblate spheroidal nanopores.

19. A method according to claim 1, in which each optically isotropic nanostructure comprises a plurality of nanopores with a random distribution, and each optically anisotropic nanostructure comprises a plurality of nanopores assembled into a nanograting.

20. A method according to claim 1, further comprising forming a plurality of the optically anisotropic nanostructures at each of a plurality of depths within the substrate, to form a three-dimensional array of spaced-apart optically anisotropic nanostructures.

21. A method according to claim 1, comprising controlling the ellipticity and/or orientation of the non-circular polarisation of the writing beam for the at least one pulse applied from the writing beam to each corresponding volume in order to encode data in each optically anisotropic nanostructure, so that the optical element is an optical data storage element.

22. An optical element fabricated according to a method of claim 1.

* * * * *